United States Patent
Matalov et al.

(10) Patent No.: US 12,456,321 B2
(45) Date of Patent: Oct. 28, 2025

(54) MEMORY-EFFICIENT FEATURE DESCRIPTORS FOR LOCALIZATION AND CLASSIFICATION OF IDENTITY DOCUMENTS

(71) Applicant: Smart Engines Service LLC, Moscow (RU)

(72) Inventors: Daniil Pavlovich Matalov, Moscow (RU); Elena Evgenyevna Limonova, Moscow (RU); Natalya Sergeevna Skoryukina, Moskovskay obl. (RU); Vladimir Viktorovich Arlazarov, Moscow (RU)

(73) Assignee: Smart Engines Service LLC, Moscow (RU)

( * ) Notice: Subject to any disclaimer, the term of this patent is extended or adjusted under 35 U.S.C. 154(b) by 357 days.

(21) Appl. No.: 17/985,309

(22) Filed: Nov. 11, 2022

(65) Prior Publication Data

US 2023/0162519 A1     May 25, 2023

(30) Foreign Application Priority Data

Nov. 19, 2021   (RU) ........................... RU2021133778

(51) Int. Cl.
*G06V 30/413*     (2022.01)
*G06V 10/32*      (2022.01)
(Continued)

(52) U.S. Cl.
CPC ............ *G06V 30/413* (2022.01); *G06V 10/32* (2022.01); *G06V 10/774* (2022.01); *G06V 10/87* (2022.01); *G06V 30/414* (2022.01); *G06V 30/418* (2022.01)

(58) Field of Classification Search
CPC .... G06V 30/413; G06V 10/32; G06V 10/774; G06V 10/87; G06V 30/414; G06V 30/418; G06V 10/764
See application file for complete search history.

(56) References Cited

U.S. PATENT DOCUMENTS

| | | | |
|---|---|---|---|
| 2016/0148074 A1* | 5/2016 | Jean ..................... | G06V 10/462 382/190 |
| 2019/0189278 A1* | 6/2019 | Matsumoto ............ | G06N 20/00 |

(Continued)

FOREIGN PATENT DOCUMENTS

CN           112991174 A   *   6/2021

OTHER PUBLICATIONS

Arm Neon documentation, available at developer.arm.com/architectures/instruction-sets/simd-isas/neon/intrinsics, Jul. 2, 2021, 387 pages.

(Continued)

*Primary Examiner* — John Villecco
*Assistant Examiner* — Kyla Guan-Ping Tiao Allen
(74) *Attorney, Agent, or Firm* — Hayes Soloway P.C.

(57) ABSTRACT

Memory-efficient feature descriptors for localization and classification of identity documents. In an embodiment, patches are extracted from an input image of a document. For each of the patches, a gradient map is constructed for a plurality of gradient orientations, a plurality of classifiers are applied to rectangles in the gradient map, and a feature descriptor is generated based on the values output by the plurality of classifiers. The feature descriptors are then compared to templates to match the document to one of the templates for document localization and classification.

16 Claims, 7 Drawing Sheets

(51) Int. Cl.
| | |
|---|---|
| G06V 10/70 | (2022.01) |
| G06V 10/764 | (2022.01) |
| G06V 10/774 | (2022.01) |
| G06V 30/414 | (2022.01) |
| G06V 30/418 | (2022.01) |

(56) References Cited

U.S. PATENT DOCUMENTS

2019/0197693 A1* 6/2019 Zagaynov ............ G06V 30/412
2022/0058496 A1* 2/2022 Rusk ........................ G06N 5/04

OTHER PUBLICATIONS

Intel Intrinsics Guide, available at software.intel.com/sites/landingpage/IntrinsicsGuide/, Dec. 2021, 2354 pages.
MIPS SIMD documentation, available at www.mips.com/products/architectures/ase/simd, Feb. 3, 2016, 326 pages.
Acharya et al., "A real-time implementation of sift using GPU," Journal of Real-Time Image Processing 14(2), 267-277 (2018).
Arlazarov et al., "MIDV-500: a dataset for identity document analysis and recognition on mobile devices in video stream," Computer Optics 43(5), 818-824 (Oct. 2019), doi.org/10.18287/2412-6179-2019-43-5-818-824.
Awal et al., "Complex document classification and localization application on identity document images," 14th International Association for Pattern Recognition (IAPR) Int'l Conference on Document Analysis and Recognition (ICDAR), IEEE (Nov. 2017), doi.org/10.1109/icdar.2017.77, 6 pages.
Baintas et al., "Pn-net: Conjoined triple deep network for learning local image descriptors," arXiv:1601.05030 (2016), 9 pages.
Bay et al., "SURF: Speeded up robust features, European Conference on Computer Vision," pp. 404-417, Springer (2006).
Bulatov et al., "Smart IDreader: Document recognition in video stream," 14th IAPR ICDAR, 6:39-44 (2017), doi.org/10.1109/icdar.2017.347.
Bulatov et al., "MIDV-2019: Challenges of the modern mobile-based document OCR," 12th Int'l Conference on Machine Vision (ICMV), 2019, Int'l Society for Optics and Photonics (SPIE) (Jan. 2020), doi.org/10.1117/12.2558438, 7 pages.
Calonder et al., "BRIEF: Binary robust independent elementary features," European Conference on Computer Vision, pp. 778-792, Springer (2010).
Dang et al., "A comparison of local features for camera-based document image retrieval and spotting," Int'l Journal on Document Analysis and Recognition (IJDAR), 22 (Sep. 2019), doi.org/10.1007/s10032-019-00329-w, 17 pages.
Dang et al., "SSKRIF: Scale and rotation invariant features based on spatial space of keypoints for camera-based information spotting," Int'l Conference on Content-Based Multimedia Indexing (CBMI), pp. 1-6 (2018), doi.org/10.1109/cbmi.2018.8516532.
Dang et al., "SRIF: Scale and rotation invariant features for camera-based document image retrieval," 13th ICDAR, pp. 601-605 (2015), doi.org/10.1109/icdar.2015.7333832.
Das et al., "Document image classification with intra-domain transfer learning and stacked generalization of deep convolutional neural networks," 24th Int'l Conference on Pattern Recognition (ICPR), pp. 3180-3185, IEEE (2018).
Fan et al., "Receptive fields selection for binary feature description," IEEE Transactions on Image Processing 23(6):2583-2595 (2014), doi.org/10.1109/tip.2014.2317981.
Goode, "Digital identity: solving the problem of trust," Biometric Technology Today, 2019(10):5-8 (2019), doi.org/10.1016/S0969-4765(19)30142-0.
Han et al., "Matchnet: Unifying feature and metric learning for patch-based matching," Proceedings of the IEEE Conference on Computer Vision and Pattern Recognition, pp. 3279-3286 (2015).
Harley et al., "Evaluation of deep convolutional nets for document image classification and retrieval," 13th ICDAR, IEEE (Aug. 2015), doi.org/10.1109/icdar.2015.7333910, 5 pages.
Jaderberg et al., "Reading text in the wild with convolutional neural networks," Int' Journal of Computer Vision 116(1):1-20 (2016).
Kumar et al., "Learning local image descriptors with deep Siamese and triple convolutional networks by minimising global loss functions," Proceedings of the IEEE Conference on Computer Vision and Pattern Recognition (CVPR) (Jun. 2016), 10 pages.
Leutenegger et al., "Binary robust invariant scalable keypoints," Int'l Conference on Computer Vision, pp. 2548-2555, IEEE (2011).
Lowe, "Object recognition from local scale-invariant features," Proceedings of the 7th IEEE Int'l Conference on Computer Vision, vol. 2, pp. 1150-1157 (1999), doi.org/10.1109/iccv.1999.790410.
Lukoyanov et al., "Modification of YAPE keypoint detection algorithm for wide local contrast range images," 10th Int'l Conference on Machine Vision (ICMV), vol. 10696, pp. 305-312, SPIE (2018), doi.org/10.1117/12.2310243.
Puybareau et al., "Real-time document detection in smartphone videos," 25th IEEE Int'l Conference on Image Processing (ICIP), pp. 1498-1502, IEEE (2018).
Rublee et al., "An efficient alternative to SIFT or SURF," Int'l Conference on Computer Vision, pp. 2564-2571, IEEE (2011).
Schapire et al., "Improved boosting algorithms using confidence-rated predictions," Machine Learning 37(3):297-336 (1999).
Simo-Serra et al., "Discriminative learning of deep convolutional feature point descriptors," Proceedings of the IEEE Int'l Conference on Computer Vision, pp. 118-126 (2015).
Skoryukina et al., "Fast method of ID documents location and type identification for mobile and server application," ICDAR, IEEE (Sep. 2019), doi.org/10.1109/icdar.2019.00141, 8 pages.
Skoryukina et al., "Memory consumption reduction for identity document classification with local and global features combination," 13th Int'l Conference on Machine Vision, vol. 11605, p. 116051G, SPIE (2021), doi.org.10/1117/12.2587033, 8 pages.
Skoryukina et al., "Impact of geometrical restrictions in RANSAC sampling on the ID document classification," 12th ICMV, vol. 11433, p. 1143306, SPIE (2020), doi.org/10.1117/12.2559306, 7 pages.
Šabanović et al., "Deep neural network-based feature descriptor for retinal image registration," IEEE 6th Workshop on Advances in Information, Electronic and Electrical Engineering (AIEEE), pp. 1-4, IEEE (2018), doi.org/10.1109/AIEEE.2018.8592033.
Suárez et al., "BEBLID: Boosted efficient binary local image descriptor," Pattern Recognition Letters 133, pp. 366-372 (May 2020), doi.org/10.1016/j.patrec.2020.04.005.
Tareen et al., "A comparative analysis of SIFT, SURF, KAZE, AKAZE, ORB, and BRISK," Int'l Conference on Computing, Mathematics and Engineering Technologies (iCoMET), pp. 1-10, IEEE (2018).
Tian et al., "L2-net: Deep learning of discriminative patch descriptor in Euclidean space," Proceedings of the IEEE CVPR (Jul. 2017), 9 pages.
Tong et al., "MA-CRNN: a multi-scale attention CRNN for Chinese text line recognition in natural scenes," IJDAR 23(2):103-114 (Nov. 2019), doi.org/10.1007/s10032-019-00348-7.
Tropin et al., "Improved algorithm of ID card detection by a priori knowledge of the document aspect ratio," 13th ICMV, SPIE (Jan. 2021), doi.org/10.1117/12.2587029, 10 pages.
Trzcinski et al., "Learning image descriptors with boosting," IEEE Transactions on Pattern Analysis and Machine Intelligence 37(3):597-610 (Mar. 2015), doi.org/10.1109/tpami.2014.2343961.
Viola et al., "Rapid object detection using a boosted cascade of simple features," Proceedings of the 2001 IEEE Computer Society Conference on CVPR, vol. 1, pp. I-I, IEEE (2001), 12 pages.
Winder et al., "Learning local image descriptors," IEEE Conference on CVPR, IEEE (Jun. 2007), doi.org/10.1109/cvpr.2007.382971, 8 pages.
Zhu et al., "Coarse-to-fine document localization in natural scene image with regional attention and recursive corner refinement," IJDAR 22(3):351-360 (2019).

* cited by examiner (Intentionally Blurry)

MEMORY-EFFICIENT FEATURE DESCRIPTORS FOR LOCALIZATION AND CLASSIFICATION OF IDENTITY DOCUMENTS

CROSS-REFERENCE TO RELATED APPLICATIONS

This application claims priority to Russian Patent App. No. 2021133778, filed on Nov. 19, 2021, which is hereby incorporated herein by reference as if set forth in full.

BACKGROUND

Field of the Invention

The embodiments described herein are generally directed to document recognition, and, more particularly, to memory-efficient feature descriptors for localization and classification of identity documents.

Description of the Related Art

Systems for recognizing identity documents are already deeply integrated into human activity, even as the pace of integration accelerates. See, e.g., Ref17. Almost every person encounters document recognition algorithms, whether it be in banking, the sharing economy, border crossing, hospitality, medicine, insurance, or any other area that requires authentication using an identity document.

The first fundamental problems in document recognition are document localization and classification. See, e.g., Ref9. Document localization usually comprises finding a document quadrangle in the document image whose vertices represent the document's corners and whose edges represent the document's borders. Document classification refers to the assignment of a document image to one of a plurality of categories based on the document's content. The misclassification of a document can be fatal for the whole document recognition process.

There are several document localization approaches that extract and analyze document boundaries, lines, segments, and corners. See, e.g., Ref37, Ref41, and Ref25. These approaches test a set of hypotheses about the consistency of the extracted geometric primitives with the distortion model of the document rectangle.

There are also some modern approaches that use deep learning for document classification and retrieval. See, e.g., Ref19 and Ref15. However, training high-accuracy algorithms requires tens of thousands of training samples, which can be difficult to obtain due to regulatory and privacy constraints. In addition, such algorithms contain millions of parameters that significantly affect computational time, as well as memory consumption of random access memory (RAM) and persistent storage.

SUMMARY

Accordingly, systems, methods, and non-transitory computer-readable media are disclosed for a fast algorithm for constructing a memory-efficient, highly discriminative local keypoint or feature descriptor for the localization and classification of identity documents.

In an embodiment, a method comprises using at least one hardware processor to: extract a plurality of patches comprising keypoints in an input image of a document; for each of the plurality of patches, construct a gradient map for a plurality of gradient orientations within the patch, apply a plurality of classifiers to a plurality of rectangles in the gradient map, wherein each of the plurality of classifiers outputs a value, and generate a feature descriptor based on the values output by the plurality of classifiers; and compare the generated feature descriptors to each of a plurality of templates to match the document to one of the plurality of templates for document localization and classification. The plurality of classifiers may be binary classifiers that each output a binary value. Constructing the gradient map may comprise computing gradient magnitudes using an $L_1$ norm. Each of the plurality of classifiers may be applied to a different one of the plurality of rectangles.

The method may further comprise using the at least one hardware processor to select the plurality of classifiers from a plurality of available classifiers so as not to exceed a maximum threshold number of classifiers. Selecting the plurality of classifiers from the plurality of available classifiers so as not to exceed the maximum threshold number of classifiers may comprise: computing an accuracy for each of the plurality of available classifiers; sorting the plurality of available classifiers in order of computed accuracies; adding one of the plurality of available classifiers having a highest computed accuracy to an output set; and adding one or more additional ones of the plurality of available classifiers to the output set, based on an evaluation of a correlation to one or more classifiers already in the output set, until either the output set contains the maximum threshold number of classifiers or all of the plurality of available classifiers have been evaluated.

Adding one or more additional ones of the plurality of available classifiers to the output set may comprise, while the output set contains less than the maximum threshold number of classifiers, for each of the plurality of available classifiers: determining whether or not the available classifier is correlated to the one or more classifiers already in the output set; when the available classifier is correlated to the one or more classifiers already in the output set, excluding the available classifier from the output set; and, when the available classifier is not correlated to the one or more classifiers already in the output set, adding the available classifier to the output set. Determining whether or not the available classifier is correlated to the one or more classifiers already in the output set may comprise: for each of the of one or more classifiers already in the output set, comparing an output of the available classifier to an output of the classifier already in the output set to determine whether or not the available classifier is correlated to the classifier already in the output set; when the available classifier is determined to correlate to at least one of the one or more classifiers already in the output set, determine that the available classifier is correlated to the one or more classifiers already in the output set; and, when the available classifier is determined to correlate to none of the one or more classifiers already in the output set, determine that the available classifier is not correlated to the one or more classifiers already in the output set.

Comparing an output of the available classifier to an output of the classifier already in the output set may comprise: for each of a plurality of pairs of image patches, for a first patch in the pair of image patches, determine whether a classification that is output by the available classifier matches a classification that is output by the classifier already in the output set, when the classifications match, increment a match counter, and when the classifications do not match, increment a no-match counter, and, for a second patch in the pair of image patches, determine whether a classification that is output by the available classifier matches a classification that is output by the classifier already in the output set, when the classifications match, increment the match counter, and when the classifications do not match, increment the no-match counter; compute a correlation value, between the available classifier and the classifier already in the output set, based on a value of the match counter and a value of the no-match counter; when the correlation value satisfies a threshold, determining that the available classifier is correlated to the classifier already in the output set; and, when the correlation value does not satisfy the threshold, determining that the available classifier is not correlated to the classifier already in the output set. The correlation value may be calculated based on a ratio of a difference, between the value of the match counter and the value of the no-match counter, and a total number of the plurality of pairs of image patches, wherein the correlation value satisfies the threshold when it is greater than the threshold and does not satisfy the threshold when it is less than the threshold. The plurality of pairs of image patches may comprise pairs of matching image patches and pairs of non-matching image patches.

The method may further comprise using the at least one hardware processor to extract the plurality of pairs of image patches from a dataset comprising a plurality of document images by, for each of one or more of the plurality of document images: identifying a first quadrangle representing document borders in the document image in an input basis; identifying a second quadrangle representing document borders in the document image in a normalized basis; identifying a set of rectangles in the document image according to the normalized basis; computing a transformation matrix between the first quadrangle and the second quadrangle; computing a scaling value as a ratio of an area of the first quadrangle to an area of the second quadrangle; computing a normalized document image by applying the transformation matrix to the document image; executing a keypoints detection algorithm on the normalized document image to obtain a set of keypoints; removing any keypoints, from the set of keypoints, that are not within at least one rectangle in the set of rectangles; for each keypoint remaining in the set of keypoints, computing a corresponding keypoint in the document image in the input basis, based on the scaling value and an inverse of the transformation matrix, extracting a first image patch for the keypoint from the normalized document image, extracting a second image patch for the corresponding keypoint from the document image in the input basis, and adding the first image patch and the second image patch as a matching pair of image patches to an output set; and output the output set as the plurality of pairs of image patches. The method may further comprise using the at least one hardware processor to randomly select the one or more document images from the plurality of document images in the dataset.

The method may further comprise using the at least one hardware processor to: extract a plurality of pairs of image patches from a dataset comprising a plurality of document images by, for each of one or more of the plurality of document images, identifying a first quadrangle representing document borders in the document image in an input basis, identifying a second quadrangle representing document borders in the document image in a normalized basis, identifying a set of rectangles in the document image according to the normalized basis, computing a transformation matrix between the first quadrangle and the second quadrangle, computing a scaling value as a ratio of an area of the first quadrangle to an area of the second quadrangle, computing a normalized document image by applying the transformation matrix to the document image, executing a keypoints detection algorithm on the normalized document image to obtain a set of keypoints, removing any keypoints, from the set of keypoints, that are not within at least one rectangle in the set of rectangles, for each keypoint remaining in the set of keypoints, computing a corresponding keypoint in the document image in the input basis, based on the scaling value and an inverse of the transformation matrix, extracting a first image patch for the keypoint from the normalized document image, extracting a second image patch for the corresponding keypoint from the document image in the input basis, and adding the first image patch and the second image patch as a matching pair of image patches to an output set, and outputting the output set as the plurality of pairs of image patches; and train the plurality of classifiers using the extracted plurality of pairs of image patches.

The method may further comprise using the at least one hardware processor to: prior to extracting the plurality of patches, receive the input image, and identify the keypoints in the input image; and, after comparing the generated feature descriptors to each of the plurality of templates, when the document is matched to one of the plurality of templates, localize and classify the document based on the matching template, and, when the document is not matched to any of the plurality of templates, reject the input image. The at least one hardware processor may be comprised in a mobile device, wherein the input image is captured by a camera of the mobile device.

Any of the methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for memory-efficient feature descriptors for localization and classification of identity documents. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. SYSTEM OVERVIEW

Figure 1:
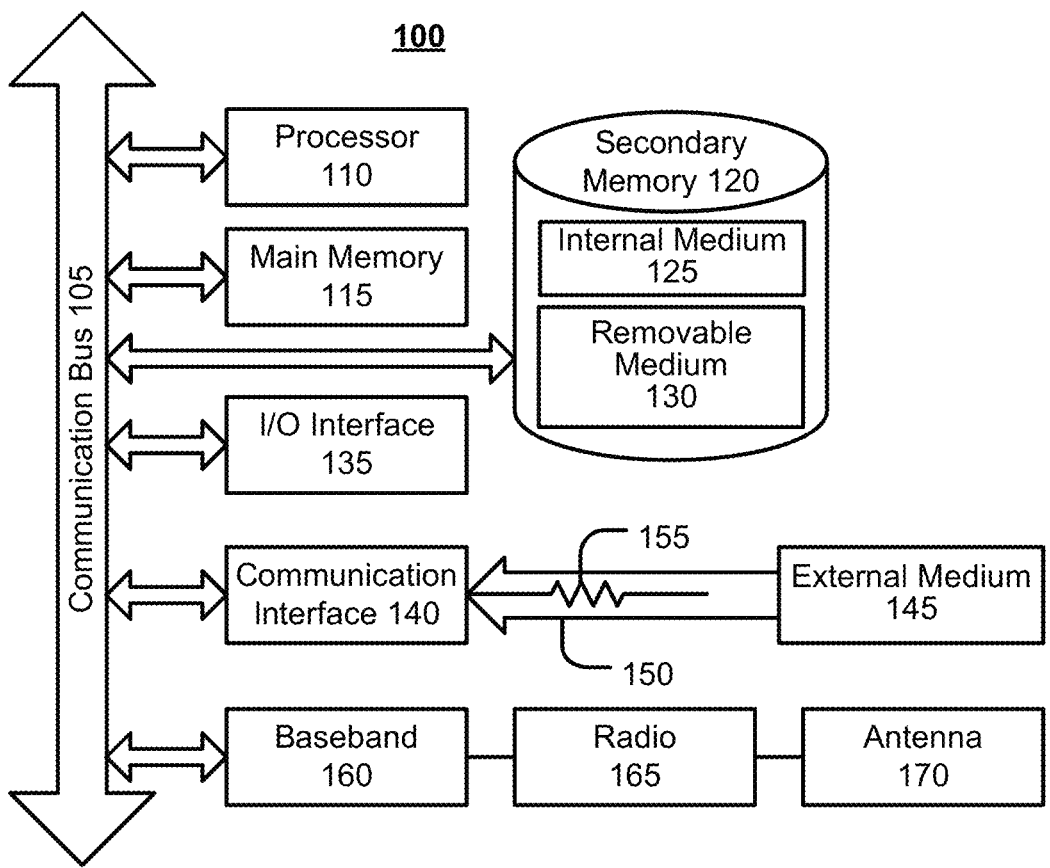
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used as or in conjunction with one or more of the functions, processes, or methods (e.g., to store and/or execute one or more software modules implementing the disclosed algorithms) described herein. System 100 can be a server or any conventional personal computer, or any other processor-enabled device that is capable of wired or wireless data communication. In a particular embodiment, system 100 is contemplated to be a mobile device, such as a smartphone. However, other computer systems and/or architectures may be also used, as will be clear to those skilled in the art.

System 100 preferably includes one or more processors 110. Processor(s) 110 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, the Pentium® processor, Core i7® processor, and Xeon® processor, all of which are available from Intel Corporation of Santa Clara, California, any of the processors (e.g., A series) available from Apple Inc. of Cupertino, any of the processors (e.g., Exynos™) available from Samsung Electronics Co., Ltd., of Seoul, South Korea, and/or the like.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 100 preferably includes a main memory 115 and may also include a secondary memory 120. Main memory 115 provides storage of instructions and data for programs executing on processor 110, such as one or more of the functions and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., disclosed software modules) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or data may be transferred to system 100, over one or more networks (e.g., including the Internet), from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, comprising one or more software modules) is stored in main memory 115 and/or secondary memory 120. Computer-executable code can also be received via communication interface 140 and stored in main memory 115 and/or secondary memory 120. Such computer-executable code, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 100 may also include optional wireless communication components that facilitate wireless communication over a voice network and/or a data network. The wireless communication components comprise an antenna system 170, a radio system 165, and a baseband system 160. In system 100, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 decodes the signal and converts it to an analog signal. Then the signal is amplified and sent to a speaker. Baseband system 160 also receives analog audio signals from a microphone. These analog audio signals are converted to digital signals and encoded by baseband system 160. Baseband system 160 also encodes the digital signals for transmission and generates a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 is also communicatively coupled with processor(s) 110. Processor(s) 110 may have access to data storage areas 115 and 120. Processor(s) 110 are preferably configured to execute instructions (i.e., computer programs, such as the disclosed algorithms or software modules) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. PROCESS OVERVIEW

Embodiments of processes for memory-efficient feature descriptors for localization and classification of identity documents will now be described in detail. It should be understood that the described processes may be embodied in one or more software modules that are executed by one or more hardware processors (e.g., processor 110), for example, as a computer program or software package. The described processes may be implemented as instructions represented in source code, object code, and/or machine code. These instructions may be executed directly by hardware processor(s) 110, or alternatively, may be executed by a virtual machine operating between the object code and hardware processors 110.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Template Matching

Specific knowledge about the type of document being recognized enables optimal parameters to be defined for document image processing, to therefore, achieve a high recognition accuracy. This may also decrease the size of the input data for character recognition algorithms, to thereby reduce the required amount of computing resources. For example, modern text-in-the-wild recognition algorithms, which are supposed to recognize all text characters regardless of their font size and semantics, require high-end computational performance. See, e.g., Ref36 and Ref20.

Identity documents often have a fixed geometry and a set of predefined elements, such as static text, logos, and fixed backgrounds. Visual-based approaches are generally the best suited for identity document recognition. See, e.g., Ref6. This is demonstrated by experimental results from a framework for identity document localization and classification that is based on template matching.

Figure 2:
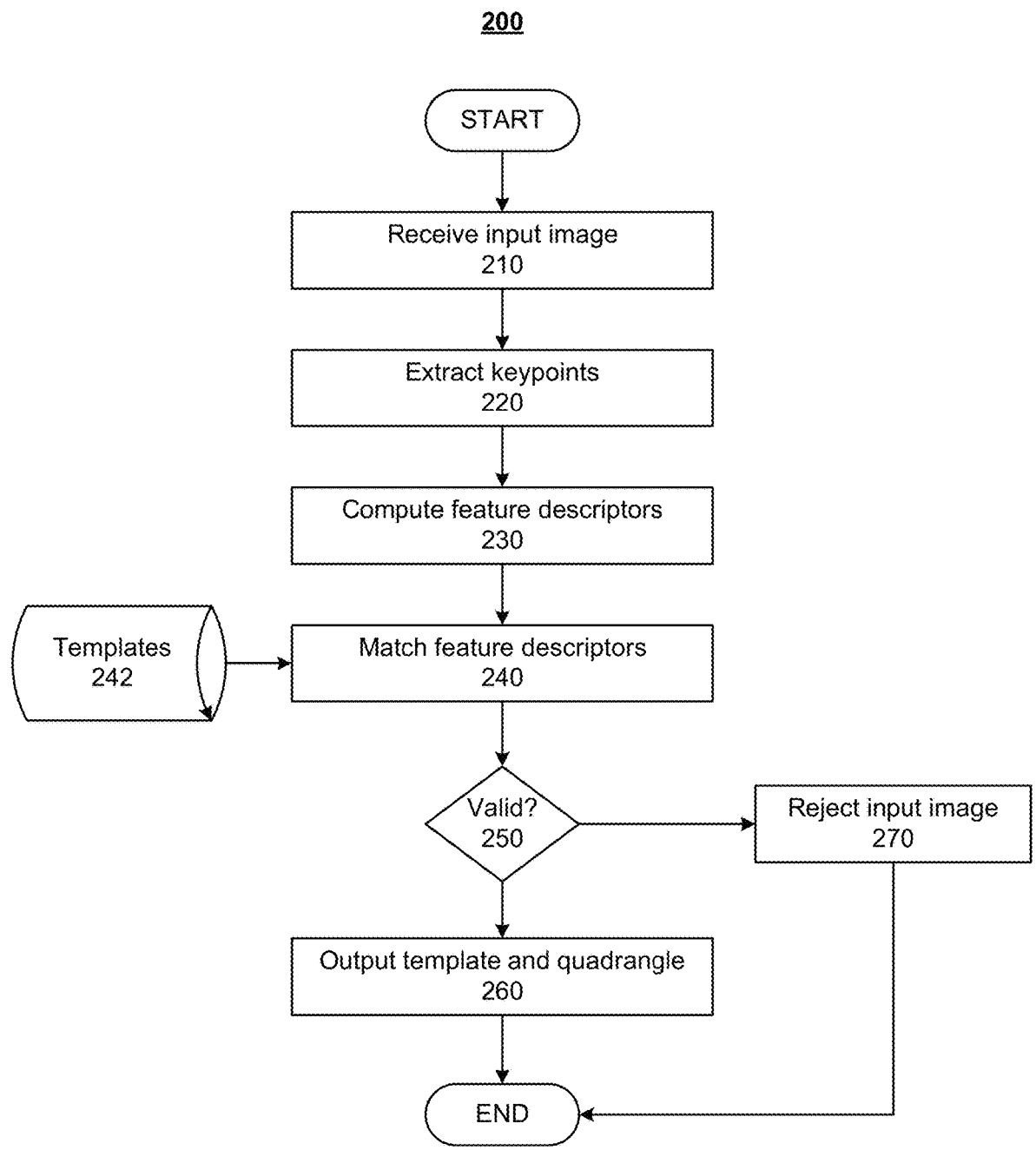
FIG. 2 illustrates an example template-matching process, according to an embodiment.

FIG. 2 illustrates an example template-matching process 200, according to an embodiment. In subprocess 210, an input image is received. The input image may be a photograph or video frame of a document, that has been captured, for example, using the camera of a mobile device, such as a smartphone, and which may have been pre-processed (e.g., cropped, normalized, etc.). In subprocess 220, keypoints are extracted from the input image. In subprocess 230, feature descriptors are computed from the extracted keypoints. In subprocess 240, the computed feature descriptors are compared to the feature descriptors of a plurality of templates, which models a plurality of document types, in a database 242, to identify a matching template. In subprocess 250, if a valid match is found (i.e., "Yes" in subprocess 250), the matching template and the document quadrangle are identified in subprocess 260. Otherwise, if no valid match is found (i.e., "No" in subprocess 250), the input image is rejected in subprocess 270.

Template-matching process 200 has the following properties:
  Robustness to the conditions under which the input image is captured, depending on the robustness of the algorithms used for subprocesses 220 and 230.
  Does not need a large training dataset. The template that models a specific document type may be built from a single exemplar of the document type.
  Exploits a model of projecting a two-dimensional plane of the three-dimensional world onto a two-dimensional plane of the input image, which leads to high-precision document localization.
  Extensible to a large number of different document types.
  Each algorithm of each subprocess (e.g., 220, 230, and 240) is modular, such that it may be replaced or improved, independently of the other subprocesses. For example, each of the keypoint-extraction algorithm, feature-descriptor-computation algorithm, and matching algorithm may be replaced or improved independently of each other.
  Extensible and flexible design. For example, several papers propose the utilization of lines and various rejection rules for hypotheses provided by random sample consensus (RANSAC). See Ref29 and Ref31.

Importantly, template-matching process 200 has demonstrated industrial precision and performance on a widespread class of devices, such as smartphones. See Ref9 and Ref29. However, with the development of industrial systems, the number of document types that must be supported increases, along with the number of indexed templates that must be constructed for all of the document types. This affects the memory consumption and speed of template-matching process 200. Ref31 demonstrates that utilization of the BinBoost descriptors (see Ref38), instead of Speeded-Up Robust Features (SURF) (see Ref8), provides a reduction in memory consumption with no noticeable changes in classification accuracy.

2.2. Introduction to Descriptor Computation

Scale-Invariant Feature Transform (SIFT) (see Ref23) is the most well-known and well-studied algorithm for detecting and computing feature descriptors (e.g., in subprocess 230). SIFT was inspired by the properties of neurons from the inferior temporal cortex, which are responsible for arbitrary object recognition in primate vision. SIFT uses handcrafted gradient-based features. According to Ref12, the SIFT descriptors are still among the most widely used description algorithms, producing the best accuracy for text document matching.

However, the SIFT description of a single keypoint is a 128-dimensional vector of real values. In the case of 32-bit floating point values, SIFT requires 4096 bits of memory to describe a single local feature. In addition, the SIFT algorithm requires significant computational resources and special GPU implementations to ensure real-time performance. See Ref4.

A number of universal descriptors, such as SURF (see Ref8), have been proposed to address the problems of intense calculations and dimensionality posed by SIFT. To increase the computational speed and to reduce memory consumption, binary descriptors have been proposed. These binary descriptors include, for example, Binary Robust Independent Elementary Features (BRIEF) (see Ref11), Binary Robust Invariant Scalable Keypoints (BRISK) (see Ref22), Oriented FAST and Rotated BRIEF (ORB) (see Ref26), and Receptive Field Descriptor (RFD) (see Ref16). Binary descriptors can be compared using the Hamming distance, which can be calculated with efficient hardware instructions and efficient memory usage. The main problem with binary descriptors is that they result in significantly lower accuracy than descriptors that comprise real values. See Ref34 and Ref30.

A number of local keypoints description algorithms, using supervised learning, have been proposed. Descriptors such as BinBoost (see Ref38) and Boosted Efficient Binary Local Image Descriptor (BEBLID) (see Ref33) modify the Ada- Boost algorithm (see Ref27) to train compact image representations. Deep learning has also been used to train descriptors. Some of these deep-learning models use the classical approach with $L_2$ loss minimization (see Ref28, Ref35, and Ref32), while most modern approaches train Siamese networks (see Ref21 and Ref28) using triplet loss optimization (see Ref7 and Ref21).

Special document-oriented descriptors have also been proposed. Ref14 introduces a descriptor that is based on the usage of geometrical constraints between pairs of nearest points around a keypoint. This descriptor directly addresses the problem of robustness of the keypoint neighborhood description under projective and affine distortions. However, the algorithm considers centroids of each word-connected component as a keypoint. This requires an algorithm for connected component extraction that has high quality and robustness to local lighting. Further modifications of the Scale and Rotation Invariant Features (SRIF) method (see Ref14) resulted in a Spatial Space of Keypoints SRIF (SSKSRIF) descriptor (see Ref13), which supports the same classical local keypoints as SURF, SIFT, and the like. However, Ref13 acknowledges that the stability of the keypoints extraction (e.g., subprocess 220) directly affects the algorithm's performance in computing feature descriptors (e.g., subprocess 230).

2.3. Computation of Feature Descriptors

Figure 3:
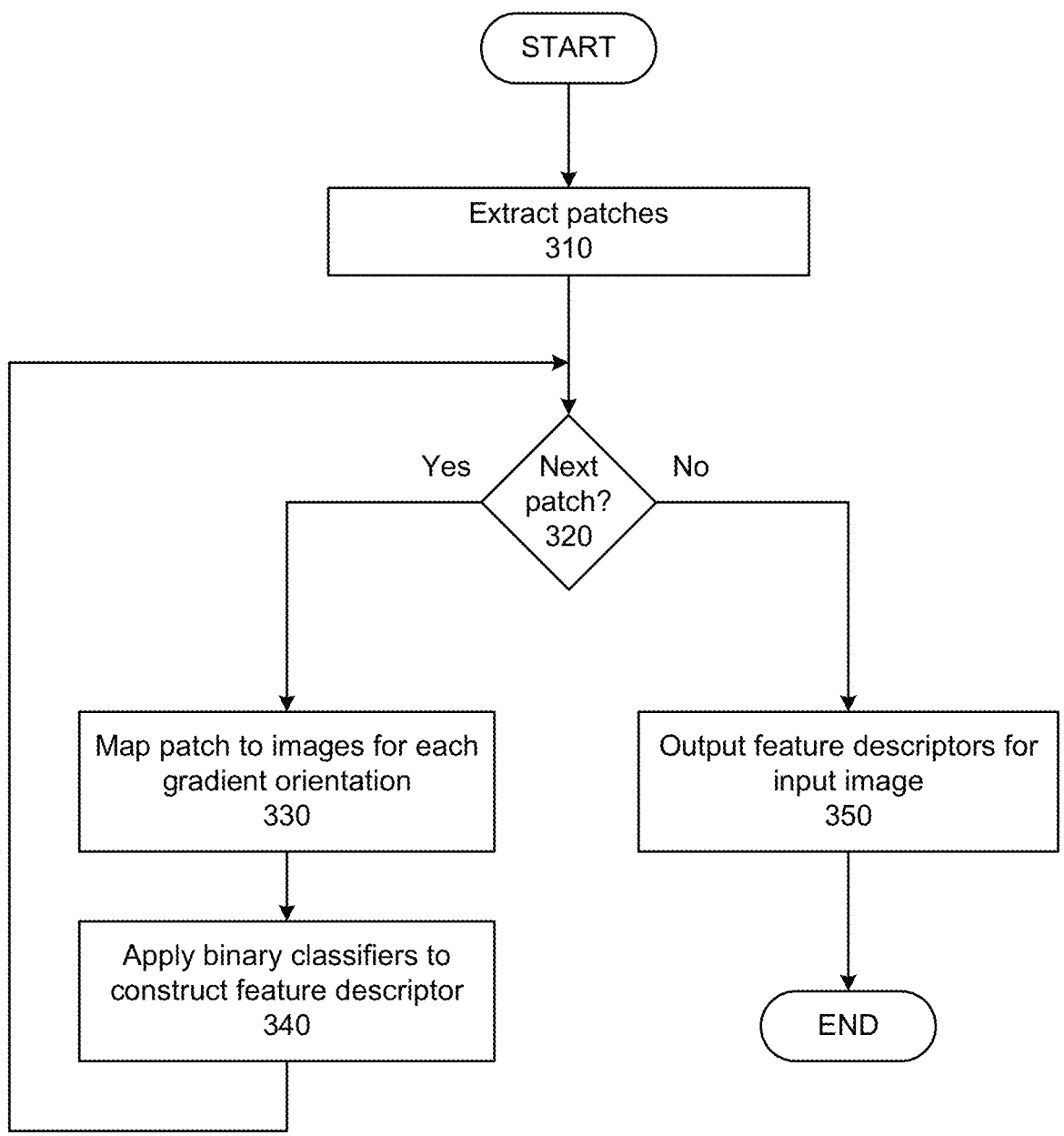
FIG. 3 illustrates the computation of feature descriptors, according to an embodiment.

FIG. 3 illustrates the computation of feature descriptors in subprocess 230, according to an embodiment. In subprocess 310, a plurality of patches are extracted from the input image. For example, the plurality of patches may be extracted based on the keypoints extracted in subprocess 220. It should be understood that subsequent subprocesses 320-340 iterate over all of the patches extracted in subprocess 310, either in parallel with subprocess 310 (e.g., as the patches are extracted) or serially (e.g., after all of the patches have been extracted).

In subprocess 320, if at least one patch remains to be processed (i.e., "Yes" in subprocess 320), subprocess 330 is performed. In subprocess 330, the feature space is constructed. For example, the input patch P may be mapped to a plurality of images (e.g., eight images) that are each produced with a bilinear soft assignment of an image gradient orientation. Each gradient orientation represents a sector of a unit circle, and each of the plurality of images is a weighted image gradient norm in a respective sector. The gradient magnitude GM may be computed for each of the gradient orientations to form a gradient map. In particular, for each point in the input image, a direction of the gradient and a magnitude (absolute value) of the gradient at this point are calculated. The magnitude of the gradient is distributed between the two closest sectors of the unit circle, and therefore, added to the corresponding point of the corresponding gradient maps for those two closest sectors. The distribution of the magnitude of the gradient is dependent on the closeness of the gradient direction to the sectors. If the gradient direction points directly to the center of the sector, the magnitude of the gradient is added to only one gradient map. If the gradient direction coincides with the boundary between two sectors, the magnitude of the gradient is distributed evenly between the two sectors. In all other cases, the distribution of the magnitude of the gradient is weighted linearly according to the angular distance between the gradient direction and the boundary between the two sectors. In an embodiment, unlike in other gradient-orientation-based feature descriptions, the gradient magnitude GM may be computed using the $L_1$ norm, to increase robustness and the speed of computation, as well as reduce memory consumption.

In subprocess 340, a plurality of binary classifiers h, within a set H, are applied to the feature space comprising the gradient map of gradient magnitudes GM to produce a feature descriptor. Each classifier h may be defined by a rectangular region R, an index c into the gradient map, and a threshold t. The classifier h outputs a binary value, for example, of either "0" (e.g., representing the absence of a corresponding feature in rectangular region R) or "1" (e.g., representing the presence of a corresponding feature in rectangular region R). The binary values that are output by all of the binary classifiers h in set H are combined into a feature descriptor for patch P. In particular, the feature descriptor D for each patch P may comprise a response vector that comprises or consists of the set of binary values (i.e., classifications) output by the set H of binary classifiers h. While embodiments will be described herein primarily with respect to binary classifiers, it should be understood that other types of classifiers, including non-binary classifiers, may be used in place of binary classifiers. Thus, any description of a process or subprocess that refers to binary classifiers should also be understood to apply equally to other types of classifiers.

Once no patches remain to be processed (i.e., "No" in subprocess 320), all of the feature descriptors D that have been constructed for the input image are output in subprocess 350. The output may comprise a plurality of feature descriptors D, comprising or consisting of one feature descriptor D for each of the plurality of patches P that were extracted in subprocess 310.

Figure 4:
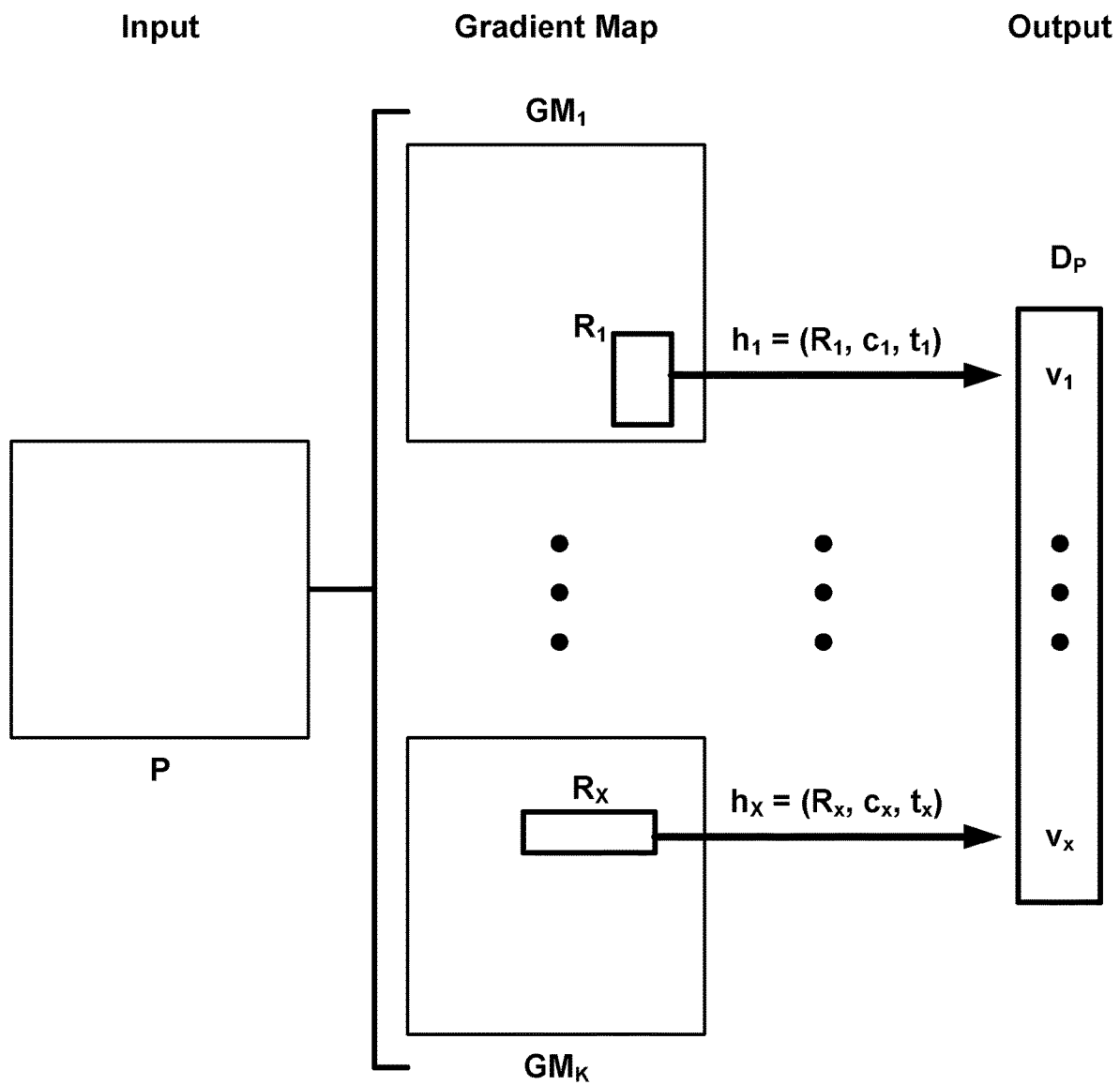
FIG. 4 illustrates an implementation of the computation of feature descriptors, according to an embodiment.

FIG. 4 illustrates subprocess 230, according to an example implementation. As illustrated, an input patch P is mapped into a feature space or gradient map comprising the gradient magnitudes $GM_1$ through $GM_K$ for K gradient orientations (e.g., K=8). Each of a plurality of binary classifiers h in a set H is applied to a defined rectangular region R, at index c within the gradient map, according to a threshold t, to produce a binary classification (e.g., "0" or "1"). For example, classifier $h_1$ is applied to region $R_1$, at index $c_1$ within the gradient map, according to a threshold $t_1$ to produce a binary value $v_1$ (e.g., "0" or "1"), whereas classifier $h_x$ is applied to region $R_x$, at index $c_x$ within the gradient map, according to a threshold $t_x$ to produce a binary value $v_x$. All of the binary values v produced by the set H of binary classifiers h are combined into a response vector, representing the feature descriptor $D_p$ for input patch P.

In an embodiment, a binary classifier h may be implemented as follows:

$$h(P) = \begin{cases} 1, & \text{if } g(P) \geq 1 \\ 0, & \text{otherwise} \end{cases}$$

wherein $$g(P) = \frac{\sum_{(x,y)} GM_c(x, y)}{\sum_{k=0}^{K-1} \sum_{(x,y)} GM_i(x, y)}$$

wherein $\Sigma_{(x,y)}$ sums over all points in the input patch P, and wherein the values of the function g(P) may be efficiently computed using the concept of integral images, as described in Ref39.

2.4. Training and Selection of Features

In an embodiment, the training and selection of the features (i.e., as represented by the binary classifiers h in set H) used in the feature descriptors D is based on the idea that the Hamming distances between matching pairs of patches P are significantly less than the Hamming distances between dissimilar pairs of patches P. The feature training may be organized into two steps: (1) a set of binary classifiers h are independently trained to establish thresholds t that lead to the highest accuracy (see Ref16); and (2) the most accurate features are selected, based on the potentially excessive correlation of the responses of binary classifiers h. In an embodiment, the manner in which feature correlation is calculated is different than in the algorithm for RFD feature selection in Ref16. In addition, unlike in Ref16, the number of selected features may be limited.

Figure 5:
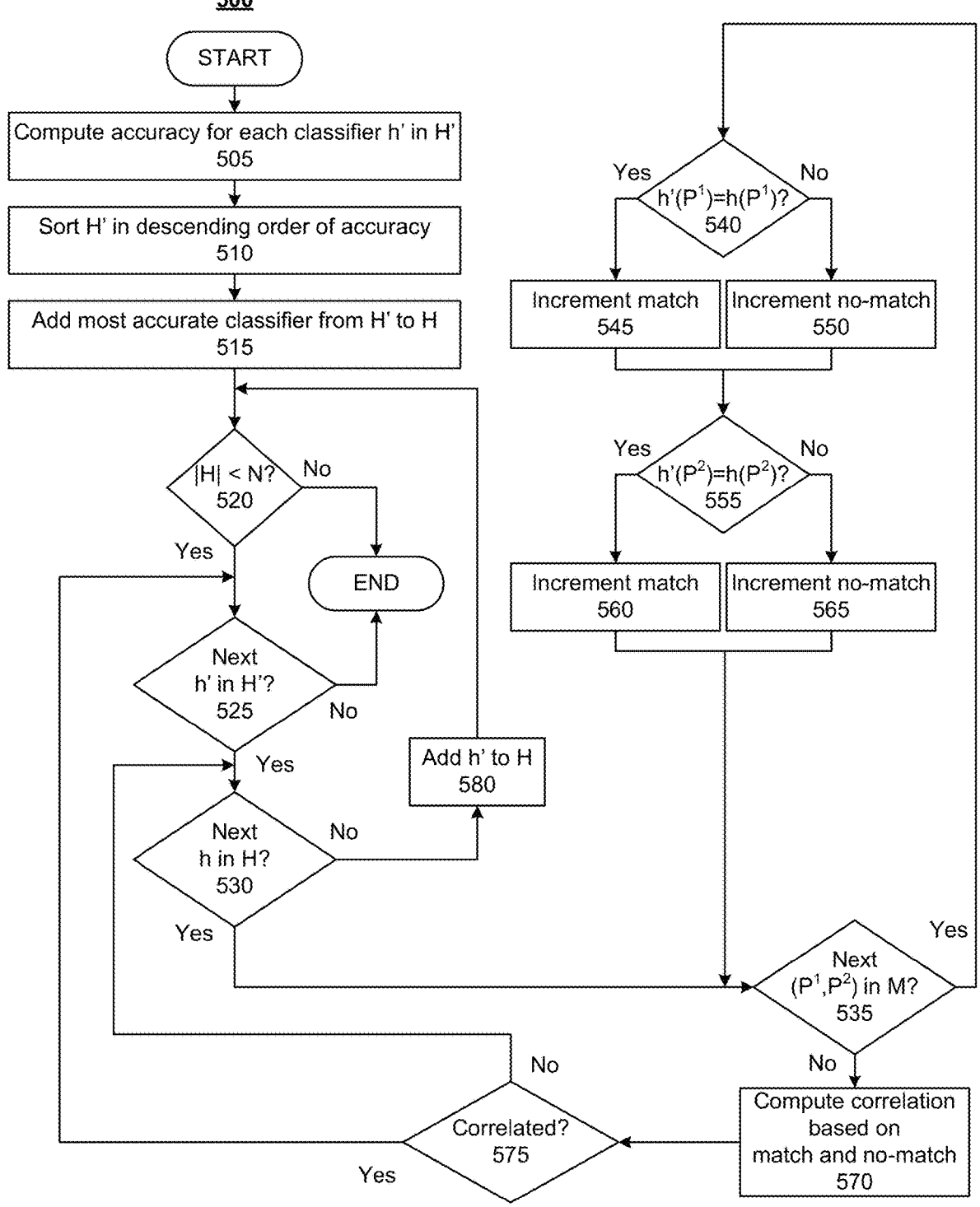
FIG. 5 illustrates an example feature-selection algorithm, according to an embodiment.

FIG. 5 illustrates an example feature-selection algorithm 500 for selecting the set H of binary classifiers h to be used in subprocess 230, according to an embodiment. The inputs to algorithm 500 may comprise:

a set M of labeled pairs of patches ($P_i^1$, $P_i^2$, $l_i$), wherein $l_i \in \{1, -1\}$ to indicate whether the pair of patches $P_i^1$ and $P_i^2$ is matching (i.e., $l_i=1$) or non-matching (i.e., $l_i=-1$);

a set H' of trained binary classifiers h' representing the available features from which algorithm 500 is to select;

a maximum number of features N to select; and/or a correlation threshold $t_c$.

The output of algorithm 500 is the set H of binary classifiers h to be used in subprocess 230.

In subprocess 505, the accuracy $q_i$ is computed for each binary classifier h' in H' using the set of patches M. Then, in subprocess 510, the binary classifiers h' in H' are sorted in descending order of their respective accuracies $q_j$, from most accurate to least accurate, such that h'$_0$ represents the most accurate of the binary classifiers h' in H'. In subprocess 515, this first and most accurate binary classifier h'$_0$ is added to the output set H of binary classifiers h. In other words, h$_0$=h'$_0$.

Next, algorithm 500 loops through iterations of the remaining subprocesses, for each binary classifier h' in H', until either the size of output set H equals the maximum number of features N (i.e., "No" in subprocess 520) or no more binary classifiers h' remain to be considered in H' (i.e., "No" in subprocess 525). If the size of output set H is less than the maximum number of features N (i.e., "Yes" in subprocess 520) and at least one binary classifier h' remains to be considered in H' (i.e., "Yes" in subprocess 525), algorithm 500 proceeds to subprocess 530 to begin comparing each binary classifier h in output set H to the current binary classifier h' under consideration from the input set H' of available binary classifiers. Notably, due to subprocess 515, there will be at least one binary classifier h in output set H at the first iteration of subprocess 530.

If at least one binary classifier h remains to be considered in output set H (i.e., "Yes" in subprocess 530), algorithm 500 proceeds to subprocess 535 to begin considering each labeled pair of patches ($P^1$, $P^2$) in input set M with respect to the current pair of binary classifiers h and h' being compared. If at least one pair of patches remain to be considered (i.e., "Yes" in subprocess 535), algorithm 500 proceeds to subprocess 540. In subprocess 540, the classification of h'($P^1$) is compared to the classification of h(P'), which may be, for example, a value of "0" or "1". If the classifications match (i.e., "Yes" in subprocess 540), a match counter is incremented in subprocess 545. Otherwise, if the classifications do not match (i.e., "No" in subprocess 540), a no-match counter is incremented in subprocess 550. Similarly, in subprocess 555, the classification of h'($P^2$) is compared to the classification of h($P^2$), which may be, for example, a value of "0" or "1". If the classifications match (i.e., "Yes" in subprocess 555), the match counter is incremented in subprocess 560. Otherwise, if the classifications do not match (i.e., "No" in subprocess 555), the no-match counter is incremented in subprocess 565.

Once all pairs of patches in M have been considered (i.e., "No" in subprocess 535), in subprocess 570, algorithm 500 computes the correlation between the current pair of binary classifiers h and h' being compared. The correlation value may model the frequency of coincidence of the responses of the pair of binary classifiers h and h' on corresponding patches in M, normalized to a range of 0 to 1. For instance, the correlation value may be computed based on the values of the match counter and the no-match counter (e.g., based on a ratio of the difference between the values of the match and no-match counters and a size of M). As an example, the correlation value between the j-th binary classifier h in H and the k-th binary classifier h' in H' may be calculated as the difference between the match counter and the no-match counter, divided by four times the size of the input set M, with a constant (e.g., 0.5) added to the quotient:

$$\frac{nm_{jk} - nd_{jk}}{4*|M|} + 0.5$$

wherein nm is the value of the match counter, nd is the value of the no-match counter, and |M| is the size of M.

In subprocess 575, if the current pair of binary classifiers h and h' are not correlated (i.e., "No" in subprocess 575), algorithm 500 selects the next binary classifier h, if any, from output set H to compare to the current binary classifier h' from the input set H'. Otherwise, if the current pair of binary classifiers h and h' are correlated (i.e., "Yes" in subprocess 575), algorithm 500 stops considering the current binary classifier h' from the input set H', and returns to subprocess 525 to consider the next binary classifier h', if any, from the input set H'. Algorithm 500 may determine that the current pair of binary classifiers h and h' is correlated if the correlation value computed in subprocess 570 satisfied a threshold. For example, in the case that higher correlation values indicate higher correlation, algorithm 500 may determine that the current pair of binary classifiers h and h' are correlated when the correlation value is greater than a threshold value, and determine that the current pair of binary classifiers h and h' are not correlated when the correlation value is less than or equal to the threshold value. Alternatively, in the case that lower correlation values indicate higher correlation, algorithm 500 may determine that the current pair of binary classifiers h and h' are correlated when the correlation value is less than a threshold value, and determine that the current pair of binary classifiers h and h' are not correlated when the correlation value is greater than or equal to the threshold value.

Once all binary classifiers h from the output set H have been considered for a given binary classifier h' from the input set H' (i.e., "No" in subprocess 530), algorithm 500 may add the binary classifier h' to the output set H in subprocess 580, and return to subprocess 520. It should be understood that, if algorithm 500 has reached the end of output set H for a given binary classifier h', then h' has not correlated with any binary classifiers h in output set H. This is because, if that binary classifier h' had correlated with any binary classifier h in output set H, "Yes" would have been determined in subprocess 575, which would have returned algorithm 500 to subprocess 525 to select the next binary classifier h' from input set H' before finishing the loop through output set H, thereby effectively discarding the current binary classifier h'. In other words, only binary classifiers h' in input set H' that are not correlated with binary classifiers h, which are already in output set H, are added to output set H.

Algorithm 500 may also be expressed in pseudocode as follows:

---
Pseudocode for Feature-Selection Algorithm 500
---
```
compute accuracy q_i for each h'_i in H' on the set of patches M;
sort H' in descending order of accuracy q_i;
H ← H ∪ {h'_0};
j ← 1;
while |H| ≤ N and j < |H'| do
    foreach j ∈ {1,...,|H'|} do
        g_j ← true;
        foreach k ∈ {1,...,|H|} do
            nm_jk ← 0, nd_jk ← 0;
            foreach m ∈ {1,...,|M|} do
                if h'_j(P^1_m) = h_k(P^1_m) then nm_jk ← nm_jk + 1;
                else nd_jk ← nd_jk + 1;
                end
                if h'_j(P^2_m) = h_k(P^2_m) then nm_jk ← nm_jk + 1;
                else nd_jk ← nd_jk + 1;
                end
            end
            corr_jk ← (nm_jk − nd_jk) / (4 • |M|) + 0.5;
            if corr_jk ≥ t_c then
                g_j ← false;
                break;
            end
        end
        if g_j = true then
            H ← H ∪ h'_j;
        end
    end
end
```

3. EXPERIMENTAL RESULTS

Experiments that were conducted using the disclosed feature descriptor will now be described in detail. However, it should be understood that the experiments utilized a particular implementation of the disclosed embodiments. Other implementations may achieve the same or different results and advantages than described herein.

3.1. Construction of Dataset

While several datasets exist for benchmarking arbitrary patch verification problems, there are no existing datasets of patches that have been extracted from identity documents. Thus, to perform experiments, a dataset of patches from identity documents was constructed using a subset of the document types from the Mobile Identity Document Video (MIDV)-500 (see Ref5) and MIDV-2019 (see Ref10) datasets. MIDV-500 contains video clips of fifty different document types captured using smartphone cameras. The image frames in MIDV-500 include complex backgrounds, projective distortions, highlighting, and other distortions that are common in images captured by hand-held devices, such as smartphones. MIDV-2019 is an extension of MIDV-500, which includes image frames of documents captured under extreme projective distortions, in low lighting, and in 4K resolution. Each video clip in MIDV-500 and MIDV-2019 consist of thirty frames with corresponding ground-truths that include coordinates of the document corners.

For experimentation, ten document types were randomly selected from each of MIDV-500 and MIDV-2019, representing drivers licenses, passports, and other types of identity documents. For each video clip, up to seven image frames were randomly selected. Any image frames, for which a document corner fell out of the frame by more than 10% of the average diagonal length of the document, were rejected. The algorithm for extracting matching (i.e., positive) pairs of patches from a single image frame may be described as follows:

---
Algorithm for Extracting Matching Patches from a Single Image Frame
---
Inputs:
F: image frame
Q: quadrangle representing the document borders in the image frame in the input basis
$N_b$: quadrangle representing the document borders in the image frame in the normalized basis
R: set of rectangles in the normalized basis
Output:
Y: set of pairs of image patches
compute transformation matrix T: $Q \rightarrow N_b$;

compute scale $s \leftarrow \dfrac{A_Q}{A_{N_b}}$ as a ratio of the area of $Q$ to the area of $N_b$;

compute normalized document image D by applying T to F;
execute a keypoints detection algorithm (see Ref24) on D to get a set of keypoints
$K \leftarrow \{(x, y, size)\} \in D$;
remove keypoint from K that do not lie inside at least one rectangle in R;
foreach keypoint $k_i = (x, y, size) \in K$ do
　　$k'_i \leftarrow (x'_i, y'_i, size'_i)$ in which $(x'_i, y'_i) \leftarrow T^{-1}(x_i, y_i)$, $size' \leftarrow size \bullet s$;
　　extract aligned image patches $(P_i, P'_i)$ for keypoints $k_i$ from D and $k'_i$ from F;
　　$Y \leftarrow Y \cup (P_i, P'_i, I_i)$ in which $I_i = 1$;
end In the above algorithm, the input parameters $N_b$ and R are specific to the document type. Quadrangle $N_b$ defines the document coordinates in a fixed-size normalized basis in which a document occupies the entire image plane. The size of the normalized basis is computed according to the physical sizes of the document type, for example, to ensure that 1 physical millimeter occupies 10 pixels. For example, the physical width and height of the alb.id template are 85.6 and 54 millimeters, respectively, such that the dimensions of the normalized basis were 856 pixels by 540 pixels. The set of rectangles R comprises document regions containing personal data. The filtering of keypoints by rectangles in the algorithm was done to avoid potential overfitting. It is assumed that the document model to be used in template-matching process 200 for a given document is built from the points of the static elements of the document type (e.g., field labels that do not change across different instances of the document type).

Figure 6:
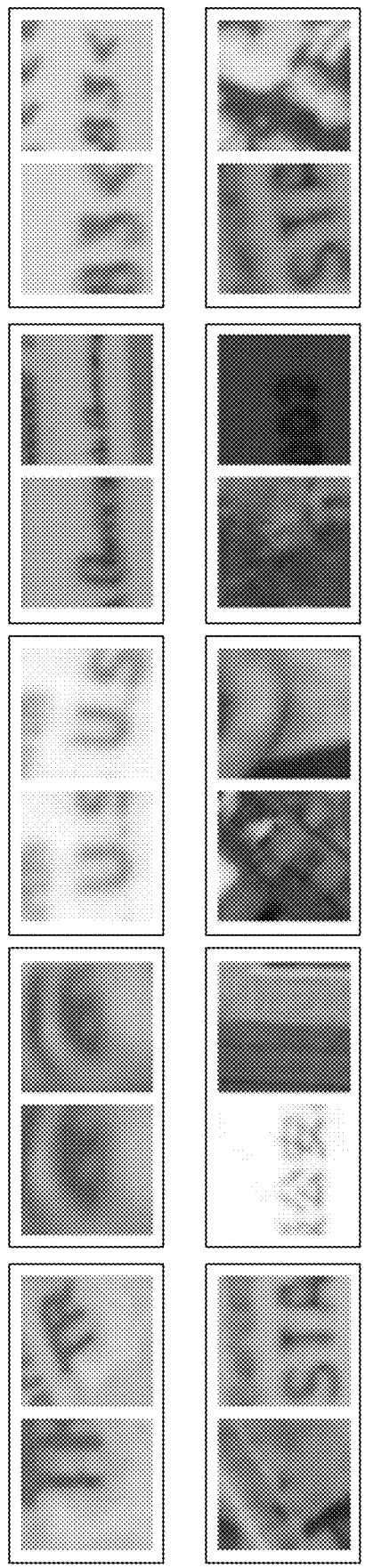
FIG. 6 illustrates examples of positive and negative pairs of image patches, according to an embodiment.

To complete the dataset of aligned patches, non-matching (i.e., negative) pairs of patches were added using the well-known Brown dataset (see Ref40). A single negative pair of patches was obtained by randomly sampling a patch from Y and a patch from the set of 500,000 patches in the Brown dataset. All of the patches from Y that were used in a negative pair of patches were removed from the positive pairs of patches in Y. The resulting dataset of positive and negative pairs of patches were divided into three subsets: 75,000 pairs for features training; 75,000 pairs for features selection (e.g., to be used as input set M in algorithm 500); and 350,000 pairs for testing. Each of the three subsets was balanced (i.e., consisted of 50% positive pairs and 50% negative pairs) and did not intersect with any of the other two subsets. FIG. 6 depicts exemplary pairs of patches from the dataset, with the top row depicting positive pairs and the bottom row depicting negative pairs. The dataset may be structured and indexed in a similar manner to the Brown dataset, as described in Ref40.

3.2. Training and Selection of Features

In the implementation for experimental purposes, the feature descriptors were computed from square images of 32 by 32 pixels. While millions of rectangles R may be generated from such an image, a huge number of them are usually highly correlated (see Ref16). The particular implementation generated rectangles with sides that were greater than or equal to 3 pixels in length and with areas less than or equal to 256 pixels. Threshold fitting was performed on the set of patches Y. To ensure compactness and increase the speed by which pairs of descriptors were compared (e.g., binary classifiers h and h' in algorithm 500), the maximum number N of selected features was limited to 192 (i.e., N=192). In addition, the threshold $t_c$ was fixed to 0.7, since smaller values of $t_c$ did not allow the selection of 192 features, whereas greater values of $t_c$ led to less discriminant descriptors and demonstrated slightly worse performance.

3.3. Performance of Patches Verification

Figure 7:
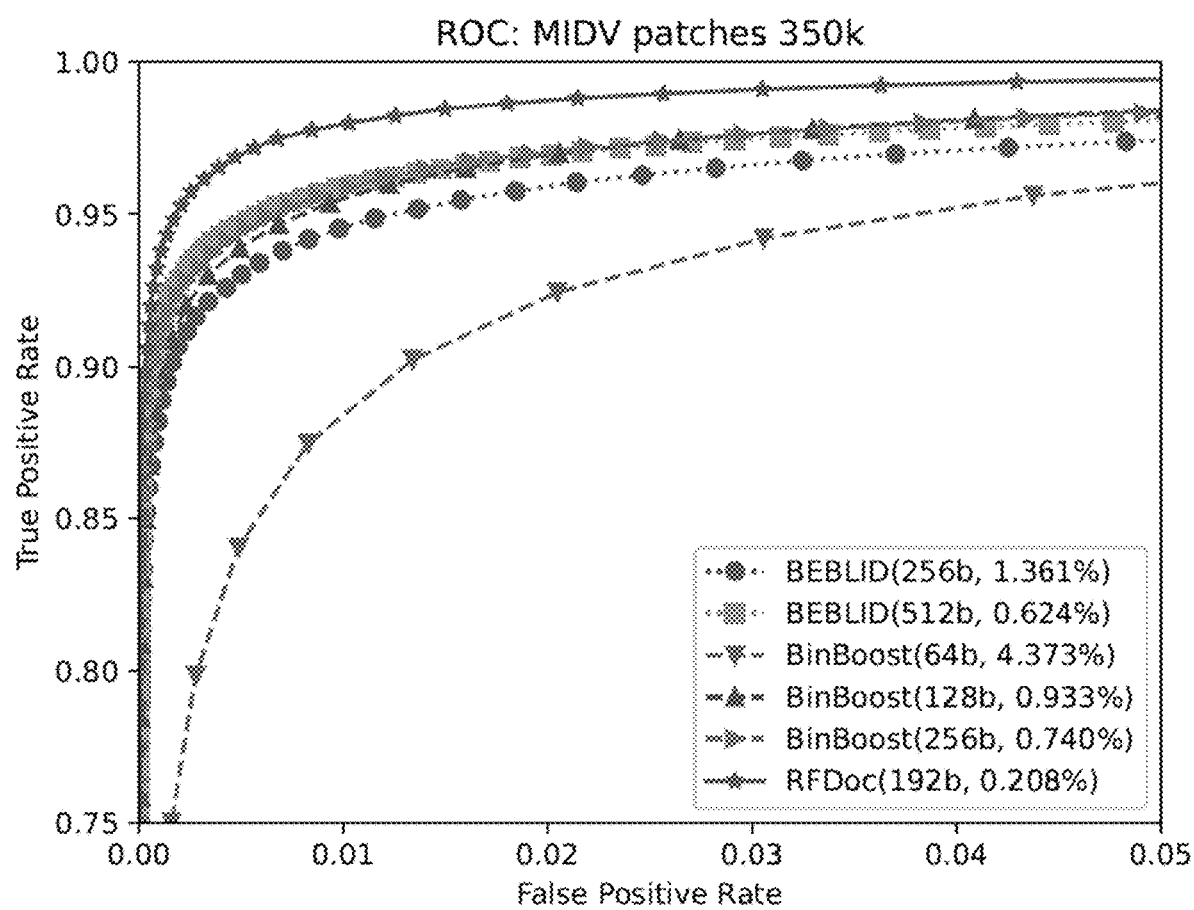
FIG. 7 illustrates the performance of an example implementation of the disclosed binary feature descriptor, relative to state-of-the-art binary feature descriptors, according to an embodiment.

As mentioned above, a subset of 350,000 pairs of patches was used for testing the disclosed feature descriptor, which may be referred to herein as "RFDoc." All experimental results were obtained using OpenCV. FIG. 7 illustrates the receiver operating characteristic (ROC) curves for the disclosed RFDoc binary descriptor and several state-of-the-art binary descriptors, including the most efficient state-of-the-art binary descriptor for arbitrary image matching, BEBLID-512 (see Ref33). In the legend of FIG. 7, the amount of bits required to store a keypoint representation and the error rate to provide a 95% true positive rate (TPR) are indicated next to the name of the binary descriptor. For example, the disclosed RFDoc binary descriptor required 192 bits to store each keypoint representation and had an error rate of 0.208% for 95% TPR.

3.4. Performance in Complex Camera-Based Document Recognition

To explore the performance of the disclosed RFDoc descriptor in the context of complex identity document location and classification, the approach proposed in Ref6 was evaluated on the remaining forty document types in the MIDV datasets (i.e., the document types not used for creating the dataset used for patch verification). However, unlike the approach in Ref6, brute-force matching was used, instead of Fast Library for Approximate Nearest Neighbors (FLANN), to achieve reproducible results and to exclude potential collisions caused by an approximate nearest neighbors search. In addition, the restrictions from Ref6 were not used, since they were too strict for the MDV datasets. All the parameters related to ideal template images, keypoint extraction, and RANSAC were fixed according to the description in Ref29. The algorithm for computing detection performance was based on a calculation of the maximum deviation of the computed coordinates for the document corners, divided by the length of the shortest side of the document borders (see Ref29). The SURF algorithm (see Ref8) was used for keypoints extraction.

The results of experiments on the MIDV-500 dataset are depicted in Table 1 below, and the results of experiments on the MIDV-2019 dataset are depicted in Table 2 below. With respect to MIDV-500, the disclosed RFDoc descriptor demonstrated similar document classification and localization performance to BEBLID-512, while being 2.65 times more memory efficient. With respect to the more challenging MIDV-2019, which includes extreme projective distortions under low lighting, the disclosed RFDoc descriptor outperformed all of the state-of-the-art binary descriptors, while demonstrating 21% fewer classification errors.

TABLE 1

Experimental Results on MIDV-500 Dataset

| Rank | Descriptor | Classification | Localization | Bits |
|---|---|---|---|---|
| 1 | BEBLID-512 (see Ref33) | 93.508 | 85.226 | 512 |
| 2 | RFDoc | 93.458 | 85.128 | 192 |
| 3 | BEBLID-256 (see Ref33) | 92.783 | 84.072 | 256 |
| 4 | BinBoost-256 (see Ref38) | 91.116 | 81.132 | 256 |
| 5 | SURF (see Ref8) | 91.241 | 82.783 | 2048 |
| 6 | BinBoost-128 (see Ref38) | 85.958 | 73.588 | 128 |

TABLE 2

Experimental Results on MIDV-2019 Dataset

| Rank | Descriptor | Classification | Localization | Bits |
|---|---|---|---|---|
| 1 | RFDoc | 88.875 | 75.535 | 192 |
| 2 | BEBLID-512 (see Ref33) | 85.854 | 75.001 | 512 |
| 3 | BEBLID-256 (see Ref33) | 83.833 | 72.368 | 256 |
| 4 | BinBoost-256 (see Ref38) | 79.916 | 63.074 | 256 |
| 5 | SURF (see Ref8) | 75.666 | 61.542 | 2048 |
| 6 | BinBoost-128 (see Ref38) | 68.791 | 50.262 | 128 |

3.5. Memory Consumption

Table 3 below depicts the amount of memory required to index the feature descriptors, with the OpenCV brute-force matcher, for the fifty document types in MIDV-500. As shown, the disclosed RFDoc descriptor is more memory efficient than BEBLID-512. If the number of document types is scaled to the number supported by industrial recognition systems (e.g., two-thousand document types), this difference in memory efficiency can become critical.

TABLE 3

Amount of Memory Required to Index Descriptors of MIDV-500 Templates

| Descriptor | Bits | Memory unpacked (MB) | Memory packed (MB) |
|---|---|---|---|
| RFDoc | 192 | 8.6 | 2.2 |
| BinBoost-128 (see Ref38) | 128 | 5.8 | 1.4 |
| BinBoost-256 (see Ref38) | 256 | 11.5 | 2.9 |
| BEBLID-256 (see Ref33) | 256 | 11.5 | 2.9 |
| BEBLID-512 (see Ref33) | 512 | 22.7 | 5.9 |
| SURF (see Ref8) | 2048 | 82.0 | 23.6 |

3.6. Matching Speed

It is difficult to reliably assess the impact of the type of descriptors on the matching speed of template-matching process 200. The matching speed is affected by the complexity of the descriptor computation, the descriptor comparison metric, the descriptor's data type, the number of document templates in database 242, and the like. Thus, the overall matching times of different types of descriptors, implemented with different degrees of code optimization, were not compared. Instead, the influence of different types of binary descriptors on the matching speed was evaluated, in terms of the number of CPU instructions required to calculate the distance between a pair of descriptors.

An important advantage of binary descriptors over integer and real-valued descriptors is the ability to utilize Hamming distance as a measure of similarity of a pair of descriptors. The computation of Hamming distance can be implemented with a bitwise XOR and population count instructions, which are typically included in the instruction set of modern processors.

One particular application of the disclosed RFDoc descriptors is edge computing, such as in smartphones, embedded systems, Internet of Thing (IoT) devices, and other systems at the edge of the network. These edge systems are typically built with a system on a chip (SoC). Most modern systems on a chip implement x86-64, Advanced Reduced Instruction Set Computing Machine (ARM), or Microprocessor without Interlocked Pipeline Stages (MIPS) architectures. These architectures provide hardware instruction for population count (e.g., popcnt) with a varying input width and processed width, as depicted in Table 4 below. Processed width is the size of the element inside an input data chunk for which the population count is computed. The principal difference between the different architectures is that the current basic x86-64 supports the population count via a single hardware instruction, whereas ARM and MIPS introduce the population count as part of single instruction, multiple data (SIMD) extensions. Population count is also supported on x86-64 via Advanced Vector Extensions (AVX)-512 on modern CPUs.

TABLE 4

Hardware Support of Population Count Instruction

| Architecture | Instruction | Input Width (bits) | Processed Width (bits) |
|---|---|---|---|
| x86-64 | POPCNT | 32/64 | 32/64 |
| x86-64 (AVX-512) | VPOPCNTW | 128/256/512 | 16/32/64 |
| ARM | VCNT | 64/128 | 8 |
| MIPS | PCNT | 128 | 8/16/32/64 |

To appropriately compare the speed of calculating the distance between different binary feature descriptors, the following algorithm was used to compute the Hamming distance, using x86-64 with AVX-512. If AVX-512 was not used, P=L, and the 64-bit data chunks can be sequentially processed with accumulation of the total Hamming distance.

---

Algorithm for Computing Hamming Distance using SIMD Extension

Input:
d0: first descriptor of length D bits
d1: second descriptor of length D bits
L: SIMD vector length in bits
P: processed width in bits
padd: an operation of pairwise addition of neighboring elements in a vector
Output:
H: Hamming distance between d0 and d1
h ← 0;
foreach i ∈ {0,...,D/L-1} do
    $h_{[iL+L-1:iL]}$ ← $h_{[iL+L-1:iL]}$ + popcnt(XOR($d0_{[iL+L-1:iL]}$, $d1_{[iL+L-1:iL]}$));
end
foreach i ∈ {0,...,$\log_2$(L/P)-1} do
    h ← $padd_i$(h);
end
H ← h;

---

To accurately measure the performance of the algorithm, the number of arithmetic logic units (ALUs) that are able to perform each operation and their latency should be considered. However, for experimental purposes, the total number of instructions was estimated, which corresponds to a case with one ALU and the same execution time for all instructions. The numbers of instructions required to process a fixed-size bit subset to calculate the Hamming distance for different architectures and binary descriptors is depicted in Table 5 below.

TABLE 5

Number of Instructions to Compute
Hamming Distance on Common SOCs

| Descriptor | Bits | x86-64 xor/popcnt/ add/total | ARM xor/popcnt/ add/total | MIPS xor/popcnt/ add/total |
|---|---|---|---|---|
| RFDoc | 192 | 3/3/2/8 | 2/2/5/9 | 2/2/2/6 |
| BEBLID-256 | 256 | 4/4/3/11 | 2/2/5/9 | 2/2/2/6 |
| BEBLID-512 | 512 | 8/8/7/23 | 4/4/7/15 | 4/4/4/12 |
| BinBoost-128 | 128 | 2/2/1/5 | 1/1/4/6 | 1/1/1/3 |
| BinBoost-256 | 256 | 4/4/3/11 | 2/2/5/9 | 2/2/2/6 |

As demonstrated, the Hamming distance computation between a pair of RFDoc descriptors is more than two times faster than the closest state-of-the-art binary descriptor in terms of quality (i.e., BEBLID-512), and only slower than the poorly performing BinBoost-128.

4. EXAMPLE EMBODIMENT

Embodiments of a memory-efficient feature descriptor for identity document localization and classification have been disclosed. A data-driven approach was used to build a feature descriptor that is suitable for matching local keypoints from identity documents in the context of simultaneous document localization and classification on mobile devices. In a first stage, features may be trained to be robust to lighting changes. In a second stage, the best-performing and most discriminant features may be selected to form a set of classifiers that represent the disclosed feature descriptor (RFDoc). To address the problem of limited computing resources, the disclosed feature descriptor is binary rather than real-valued.

A problem-specific dataset of aligned patches was extracted from a subset of identity document types, represented in the MDV datasets, and used to train and test the disclosed feature descriptor. The disclosed feature descriptor demonstrated three times fewer errors in terms of the 95% TPR metric than the state-of-the-art BEBLID-512 descriptor for patches verification. In complex camera-based identity document localization and classification on the MIDV-500 dataset, the disclosed feature descriptor performed similarly to the BEBLID-512 descriptor, with just 5% more classification errors, while being 2.65 times more memory efficient. On the more challenging MIDV-2019 dataset, the disclosed feature descriptor demonstrated the best performance with 21% fewer errors than the closest state-of-the-art binary descriptor (i.e., BEBLID-512). Notably, it is possible to further reduce the memory footprint of the disclosed feature descriptor by reducing the total number of features included in the descriptor (e.g., by reducing the maximum number N of features). The disclosed feature descriptor may also be applied to other tasks (i.e., other than identity document localization and classification).

5. REFERENCES

Many of the following references have been referred to herein, and all of the following references are incorporated herein by reference as if set forth and full:

Ref1: ARM NEON documentation, available at developer.arm.com/architectures/instruction-sets/simd-isas/neon/intrinsics.

Ref2: Intel Intrinsics Guide, available at software.intel.com/sites/landingpage/IntrinsicsGuide/.

Ref3: MIPS SIMD documentation, available at www.mips.com/products/architectures/ase/simd.

Ref4: Acharya et al., "A real-time implementation of sift using GPU," Journal of Real-Time Image Processing 14(2), 267-277 (2018).

Ref5: Arlazarov et al., "MIDV-500: a dataset for identity document analysis and recognition on mobile devices in video stream," Computer Optics 43(5), 818-824 (October 2019), doi.org/10.18287/2412-6179-2019-43-5-818-824.

Ref6: Awal et al., "Complex document classification and localization application on identity document images," 14th International Association for Pattern Recognition (IAPR) Int'l Conference on Document Analysis and Recognition (ICDAR), IEEE (November 2017), doi.org/10.1109/icdar.2017.77.

Ref7: Balntas et al., "Pn-net: Conjoined triple deep network for learning local image descriptors," arXiv:1601.05030 (2016).

Ref8: Bay et al., "SURF: Speeded up robust features," European Conference on Computer Vision," pp. 404-417, Springer (2006).

Ref9: Bulatov et al., "Smart IDreader: Document recognition in video stream," 14th IAPR ICDAR, 6:39-44 (2017), doi.org/10.1109/icdar.2017.347.

Ref10: Bulatov et al., "MIDV-2019: Challenges of the modern mobile-based document OCR," 12th Int'l Conference on Machine Vision (ICMV), 2019, Int'l Society for Optics and Photonics (SPIE) (January 2020), doi.org/10.1117/12.2558438.

Ref11: Calonder et al., "BRIEF: Binary robust independent elementary features," European Conference on Computer Vision, pp. 778-792, Springer (2010).

Ref12: Dang et al., "A comparison of local features for camera-based document image retrieval and spotting," Int'l Journal on Document Analysis and Recognition (IJDAR), 22 (September 2019), doi.org/10.1007/s10032-019-00329-w.

Ref13: Dang et al., "SSKRIF: Scale and rotation invariant features based on spatial space of keypoints for camera-based information spotting," Int'l Conference on Content-Based Multimedia Indexing (CBMI), pp. 1-6 (2018), doi.org/10.1109/cbmi.2018.8516532.

Ref14: Dang et al., "SRIF: Scale and rotation invariant features for camera-based document image retrieval," 13th ICDAR, pp. 601-605 (2015), doi.org/10.1109/icdar.2015.7333832.

Ref15: Das et al., "Document image classification with intra-domain transfer learning and stacked generalization of deep convolutional neural networks," 24th Int'l Conference on Pattern Recognition (ICPR), pp. 3180-3185, IEEE (2018).

Ref16: Fan et al., "Receptive fields selection for binary feature description," IEEE Transactions on Image Processing 23(6):2583-2595 (2014), doi.org/10.1109/tip.2014.2317981.

Ref17: Goode, "Digital identity: solving the problem of trust," Biometric Technology Today, 2019(10):5-8 (2019), doi.org/10.1016/S0969-4765(19)30142-0.

Ref18: Han et al., "Matchnet: Unifying feature and metric learning for patch-based matching," Proceedings of the IEEE Conference on Computer Vision and Pattern Recognition, pp. 3279-3286 (2015).

Ref19: Harley et al., "Evaluation of deep convolutional nets for document image classification and retrieval," 13th ICDAR, IEEE (August 2015), doi.org/10.1109/icdar.2015.7333910.

Ref20: Jaderberg et al., "Reading text in the wild with convolutional neural networks," Int' Journal of Computer Vision 116(1):1-20 (2016).

Ref21: Kumar et al., "Learning local image descriptors with deep Siamese and triple convolutional networks by minimising global loss functions," Proceedings of the IEEE Conference on Computer Vision and Pattern Recognition (CVPR) (June 2016).

Ref22: Leutenegger et al., "Binary robust invariant scalable keypoints," Int'l Conference on Computer Vision, pp. 2548-2555, IEEE (2011).

Ref23: Lowe, "Object recognition from local scale-invariant features," Proceedings of the 7th IEEE Int'l Conference on Computer Vision, vol. 2, pp. 1150-1157 (1999), doi.org/10.1109/iccv.1999.790410.

Ref24: Lukoyanov et al., "Modification of YAPE keypoint detection algorithm for wide local contrast range images," 10th Int'l Conference on Machine Vision (ICMV), vol. 10696, pp. 305-312, SPIE (2018), doi.org/10.1117/12.2310243.

Ref25: Puybareau et al., "Real-time document detection in smartphone videos," 25th IEEE Int'l Conference on Image Processing (ICIP), pp. 1498-1502, IEEE (2018).

Ref26: Rublee et al., "An efficient alternative to SIFT or SURF," Int'l Conference on Computer Vision, pp. 2564-2571, IEEE (2011).

Ref27: Schapire et al., "Improved boosting algorithms using confidence-rated predictions," Machine Learning 37(3): 297-336 (1999).

Ref28: Simo-Serra et al., "Discriminative learning of deep convolutional feature point descriptors," Proceedings of the IEEE Int'l Conference on Computer Vision, pp. 118-126 (2015).

Ref29: Skoryukina et al., "Fast method of ID documents location and type identification for mobile and server application," ICDAR, IEEE (September 2019), doi.org/10.1109/icdar.2019.00141.

Ref30: Skoryukina et al., "Memory consumption reduction for identity document classification with local and global features combination," 13th Int'l Conference on Machine Vision, vol. 11605, p. 116051G, SPIE (2021), doi.org.10/1117/12.2587033.

Ref31: Skoryukina et al., "Impact of geometrical restrictions in RANSAC sampling on the ID document classification, " 12th ICMV, vol. 11433, p. 1143306, SPIE (2020), doi.org/10.1117/12.2559306.

Ref32: Stankeviéius et al., "Deep neural network-based feature descriptor for retinal image registration," IEEE 6th Workshop on Advances in Information, Electronic and Electrical Engineering (AIEEE), pp. 1-4, IEEE (2018), doi.org/10.1109/AIEEE.2018.8592033.

Ref33: Suárez et al., "BEBLID: Boosted efficient binary local image descriptor," Pattern Recognition Letters 133, pp. 366-372 (May 2020), doi.org/10.1016/j.patrec.2020.04.005.

Ref34: Tareen et al., "A comparative analysis of SIFT, SURF, KAZE, AKAZE, ORB, and BRISK," Int'l Conference on Computing, Mathematics and Engineering Technologies (iCoMET), pp. 1-10, IEEE (2018).

Ref35: Tian et al., "L2-net: Deep learning of discriminative patch descriptor in Euclidean space," Proceedings of the IEEE CVPR (July 2017).

Ref36: Tong et al., "MA-CRNN: a multi-scale attention CRNN for Chinese text line recognition in natural scenes," IJDAR 23(2):103-114 (November 2019), doi.org/10.1007/s10032-019-00348-7.

Ref37: Tropin et al., "Improved algorithm of ID card detection by a priori knowledge of the document aspect ratio," 13th ICMV, SPIE (January 2021), doi.org/10.1117/12.2587029.

Ref38: Trzcinski et al., "Learning image descriptors with boosting," IEEE Transactions on Pattern Analysis and Machine Intelligence 37(3):597-610 (March 2015), doi.org/10.1109/tpami.2014.2343961.

Ref39: Viola et al., "Rapid object detection using a boosted cascade of simple features," Proceedings of the 2001 IEEE Computer Society Conference on CVPR, vol. 1, pp. I-I, IEEE (2001).

Ref40: Winder et al., "Learning local image descriptors," IEEE Conference on CVPR, IEEE (June 2007), doi.org/10.1109/cvpr.2007.382971.

Ref41: Zhu et al., "Coarse-to-fine document localization in natural scene image with regional attention and recursive corner refinement," IJDAR 22(3):351-360 (2019).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
    select a plurality of classifiers from a plurality of available classifiers so as not to exceed a maximum threshold number of classifiers, wherein selecting the plurality of classifiers from the plurality of available classifiers so as not to exceed the maximum threshold number of classifiers comprises
        computing an accuracy for each of the plurality of available classifiers,
        sorting the plurality of available classifiers in order of computed accuracies,
        adding one of the plurality of available classifiers having a highest computed accuracy to an output set, and
        adding one or more additional ones of the plurality of available classifiers to the output set, based on an evaluation of a correlation to one or more classifiers already in the output set, until either the output set contains the maximum threshold number of classifiers or all of the plurality of available classifiers have been evaluated;

extract a plurality of patches comprising keypoints in an input image of a document;

for each of the plurality of patches, construct a gradient map for a plurality of gradient orientations within the patch, apply the plurality of classifiers to a plurality of rectangles in the gradient map, wherein each of the plurality of classifiers outputs a value, and generate a feature descriptor based on the values output by the plurality of classifiers; and compare the generated feature descriptors to each of a plurality of templates to match the document to one of the plurality of templates for document localization and classification.

2. The method of claim 1, wherein the plurality of classifiers are binary classifiers that each output a binary value.

3. The method of claim 1, wherein constructing the gradient map comprises computing gradient magnitudes using an $L_1$ norm.

4. The method of claim 1, wherein each of the plurality of classifiers is applied to a different one of the plurality of rectangles.

5. The method of claim 1, wherein adding one or more additional ones of the plurality of available classifiers to the output set comprises, while the output set contains less than the maximum threshold number of classifiers, for each of the plurality of available classifiers:

determining whether or not the available classifier is correlated to the one or more classifiers already in the output set;

when the available classifier is correlated to the one or more classifiers already in the output set, excluding the available classifier from the output set; and, when the available classifier is not correlated to the one or more classifiers already in the output set, adding the available classifier to the output set.

6. The method of claim 5, wherein determining whether or not the available classifier is correlated to the one or more classifiers already in the output set comprises:

for each of the of one or more classifiers already in the output set, comparing an output of the available classifier to an output of the classifier already in the output set to determine whether or not the available classifier is correlated to the classifier already in the output set;

when the available classifier is determined to correlate to at least one of the one or more classifiers already in the output set, determine that the available classifier is correlated to the one or more classifiers already in the output set; and, when the available classifier is determined to correlate to none of the one or more classifiers already in the output set, determine that the available classifier is not correlated to the one or more classifiers already in the output set.

7. The method of claim 6, wherein comparing an output of the available classifier to an output of the classifier already in the output set comprises:

for each of a plurality of pairs of image patches, for a first patch in the pair of image patches, determine whether a classification that is output by the available classifier matches a classification that is output by the classifier already in the output set, when the classifications match, increment a match counter, and when the classifications do not match, increment a no-match counter, and, for a second patch in the pair of image patches, determine whether a classification that is output by the available classifier matches a classification that is output by the classifier already in the output set, when the classifications match, increment the match counter, and when the classifications do not match, increment the no-match counter;

compute a correlation value, between the available classifier and the classifier already in the output set, based on a value of the match counter and a value of the no-match counter;

when the correlation value satisfies a threshold, determining that the available classifier is correlated to the classifier already in the output set; and, when the correlation value does not satisfy the threshold, determining that the available classifier is not correlated to the classifier already in the output set.

8. The method of claim 7, wherein the correlation value is calculated based on a ratio of a difference, between the value of the match counter and the value of the no-match counter, and a total number of the plurality of pairs of image patches, and wherein the correlation value satisfies the threshold when it is greater than the threshold and does not satisfy the threshold when it is less than the threshold.

9. The method of claim 7, wherein the plurality of pairs of image patches comprises pairs of matching image patches and pairs of non-matching image patches.

10. The method of claim 7, further comprising using the at least one hardware processor to extract the plurality of pairs of image patches from a dataset comprising a plurality of document images by, for each of one or more of the plurality of document images:

identifying a first quadrangle representing document borders in the document image in an input basis;

identifying a second quadrangle representing document borders in the document image in a normalized basis;

identifying a set of rectangles in the document image according to the normalized basis;

computing a transformation matrix between the first quadrangle and the second quadrangle;

computing a scaling value as a ratio of an area of the first quadrangle to an area of the second quadrangle;

computing a normalized document image by applying the transformation matrix to the document image;

executing a keypoints detection algorithm on the normalized document image to obtain a set of keypoints;

removing any keypoints, from the set of keypoints, that are not within at least one rectangle in the set of rectangles;

for each keypoint remaining in the set of keypoints, computing a corresponding keypoint in the document image in the input basis, based on the scaling value and an inverse of the transformation matrix, extracting a first image patch for the keypoint from the normalized document image, extracting a second image patch for the corresponding keypoint from the document image in the input basis, and adding the first image patch and the second image patch as a matching pair of image patches to an output set; and output the output set as the plurality of pairs of image patches.

11. The method of claim 10, further comprising using the at least one hardware processor to randomly select the one or more document images from the plurality of document images in the dataset.

12. A method comprising using at least one hardware processor to:

during a training phase,
extract a plurality of pairs of image patches from a dataset comprising a plurality of document images by, for each of one or more of the plurality of document images,
identifying a first quadrangle representing document borders in the document image in an input basis,
identifying a second quadrangle representing document borders in the document image in a normalized basis,
identifying a set of rectangles in the document image according to the normalized basis,
computing a transformation matrix between the first quadrangle and the second quadrangle,
computing a scaling value as a ratio of an area of the first quadrangle to an area of the second quadrangle,
computing a normalized document image by applying the transformation matrix to the document image,
executing a keypoints detection algorithm on the normalized document image to obtain a set of keypoints,
removing any keypoints, from the set of keypoints, that are not within at least one rectangle in the set of rectangles,
for each keypoint remaining in the set of keypoints,
computing a corresponding keypoint in the document image in the input basis, based on the scaling value and an inverse of the transformation matrix,
extracting a first image patch for the keypoint from the normalized document image,
extracting a second image patch for the corresponding keypoint from the document image in the input basis, and
adding the first image patch and the second image patch as a matching pair of image patches to an output set, and
outputting the output set as the plurality of pairs of image patches, and
train a plurality of classifiers using the extracted plurality of pairs of image patches; and during an operation phase,
extract a plurality of patches comprising keypoints in an input image of a document,
for each of the plurality of patches,
construct a gradient map for a plurality of gradient orientations within the patch,
apply the plurality of classifiers to a plurality of rectangles in the gradient map, wherein each of the plurality of classifiers outputs a value, and
generate a feature descriptor based on the values output by the plurality of classifiers, and
compare the generated feature descriptors to each of a plurality of templates to match the document to one of the plurality of templates for document localization and classification.

13. The method of claim 1, further comprising using the at least one hardware processor to:
prior to extracting the plurality of patches,
receive the input image, and
identify the keypoints in the input image; and,
after comparing the generated feature descriptors to each of the plurality of templates,
when the document is matched to one of the plurality of templates, localize and classify the document based on the matching template, and,
when the document is not matched to any of the plurality of templates, reject the input image.

14. The method of claim 13, wherein the at least one hardware processor is comprised in a mobile device, and wherein the input image is captured by a camera of the mobile device.

15. A system comprising:
at least one hardware processor; and
one or more software modules that are configured to, when executed by the at least one hardware processor,
select a plurality of classifiers from a plurality of available classifiers so as not to exceed a maximum threshold number of classifiers, wherein selecting the plurality of classifiers from the plurality of available classifiers so as not to exceed the maximum threshold number of classifiers comprises
computing an accuracy for each of the plurality of available classifiers,
sorting the plurality of available classifiers in order of computed accuracies,
adding one of the plurality of available classifiers having a highest computed accuracy to an output set, and
adding one or more additional ones of the plurality of available classifiers to the output set, based on an evaluation of a correlation to one or more classifiers already in the output set, until either the output set contains the maximum threshold number of classifiers or all of the plurality of available classifiers have been evaluated,
extract a plurality of patches comprising keypoints in an input image of a document,
for each of the plurality of patches,
construct a gradient map for a plurality of gradient orientations within the patch,
apply the plurality of classifiers to a plurality of rectangles in the gradient map, wherein each of the plurality of classifiers outputs a value, and
generate a feature descriptor based on the values output by the plurality of classifiers, and
compare the generated feature descriptors to each of a plurality of templates to match the document to one of the plurality of templates for document localization and classification.

16. A non-transitory computer-readable medium having instructions stored therein, wherein the instructions, when executed by a processor, cause the processor to:
select a plurality of classifiers from a plurality of available classifiers so as not to exceed a maximum threshold number of classifiers, wherein selecting the plurality of classifiers from the plurality of available classifiers so as not to exceed the maximum threshold number of classifiers comprises
  computing an accuracy for each of the plurality of available classifiers,
  sorting the plurality of available classifiers in order of computed accuracies,
  adding one of the plurality of available classifiers having a highest computed accuracy to an output set, and
  adding one or more additional ones of the plurality of available classifiers to the output set, based on an evaluation of a correlation to one or more classifiers already in the output set, until either the output set contains the maximum threshold number of classifiers or all of the plurality of available classifiers have been evaluated;
extract a plurality of patches comprising keypoints in an input image of a document;
for each of the plurality of patches,
  construct a gradient map for a plurality of gradient orientations within the patch,
  apply the plurality of classifiers to a plurality of rectangles in the gradient map, wherein each of the plurality of classifiers outputs a value, and
  generate a feature descriptor based on the values output by the plurality of classifiers; and
compare the generated feature descriptors to each of a plurality of templates to match the document to one of the plurality of templates for document localization and classification.

* * * * *